July 19, 1938.  T. FOOTE  2,124,464
EGG LIFT
Filed Nov. 16, 1936
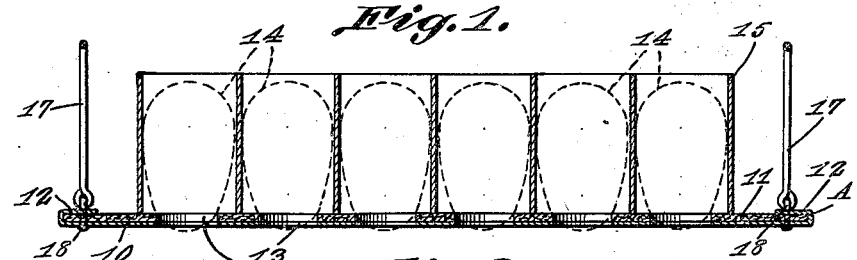
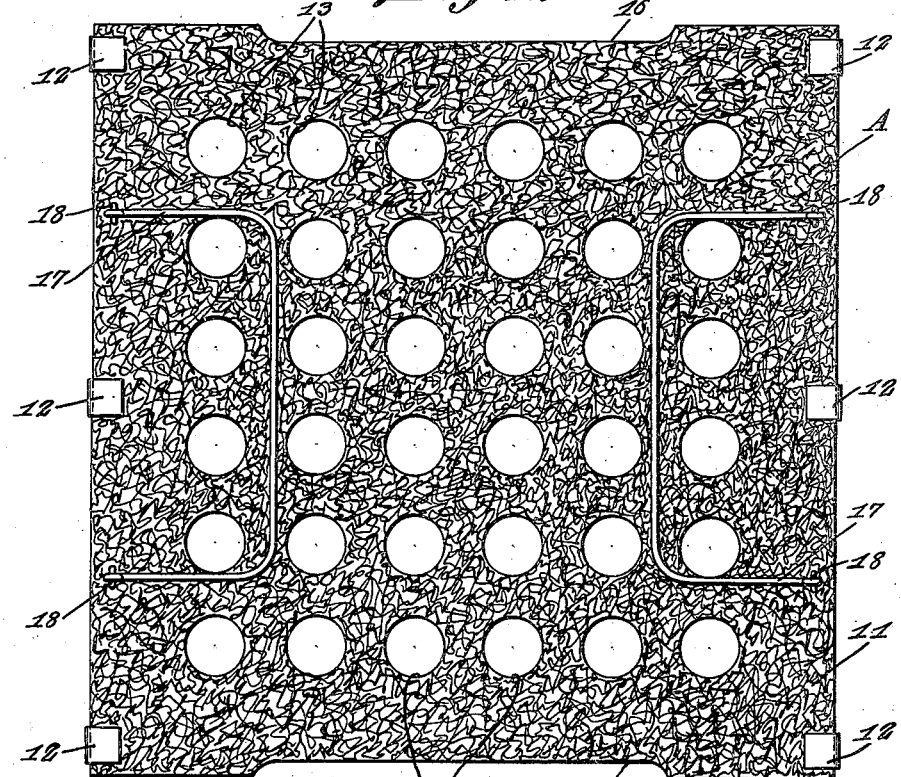
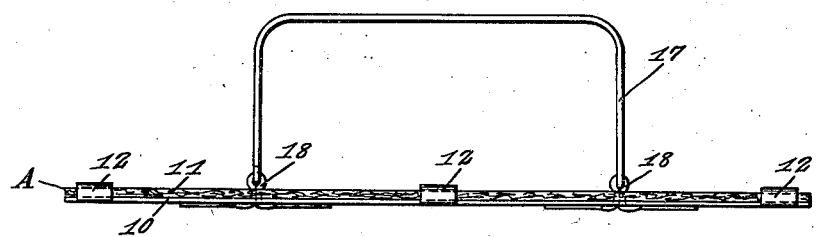
Theodore Foote, INVENTOR
BY Victor J. Evans & Co.
ATTORNEYS Patented July 19, 1938

2,124,464

UNITED STATES PATENT OFFICE 2,124,464

EGG LIFT

Theodore Foote, Pilger, Nebr.

Application November 16, 1936, Serial No. 111,157

1 Claim. (Cl. 217—27)

The invention relates to an egg lift and more especially to an egg case flat for use in candling eggs.

The primary object of the invention is the provision of a device of this character, wherein a number of eggs while within a filler for an egg case or crate can be conveniently lifted so as to enable the candling or testing of the eggs when within the filler and thereby eliminating the necessity of the removal of the eggs from such filler during candling.

Another object of the invention is the provision of a device of this character, wherein handles are provided and the latter will occupy cut away portions of the next higher lift at opposite edges when supporting fillers and the eggs carried by the lifts are within a crate, case or the like so that the eggs will be nested and the candling or testing thereof can be had with dispatch, each lift being equipped with a cork covering to avoid the breaking of the eggs when subjected to jolts or jars in the handling of the lift during candling or testing of the eggs.

A further object of the invention is the provision of a device of this character, which is simple in construction, thoroughly reliable and effective in operation, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a vertical sectional view through a lift constructed in accordance with the invention and showing a filler for the nesting of eggs superimposed upon said lift.

Figure 2 is a top plan view of the lift.

Figure 3 is a side elevation of the same.

Similar reference characters indicate corresponding parts throughout the several views in the drawing.

Referring to the drawing in detail, the lift comprises a substantially square-shaped body A including a sheet tin or metal bottom section 10 having superimposed thereon a cork cover or top section 11, these being matched while said sections are held united through the medium of spaced bendable ears or tongues 12 cut from the bottom section 10 at opposed edges thereof and such ears or tongues are turned upwardly and inwardly onto the section 11 thus fastening this section superimposed upon the bottom section 10.

Formed in the bottom and top sections 10 and 11 are registering holes 13 which are arranged spaced from each other in rows uniformly spaced one from the other and these holes are adapted to accommodate eggs 14 which are seated therein by the insertion of the smaller ends of said eggs within these holes.

Adapted to be supported by the lift is an egg filler 15 for the nesting of the eggs 14 when seated in the holes 13 of the said lift.

At opposite edges of the sections 10 and 11 are matched inset clearances or recesses 16 which are adapted for accommodating swinging bail handles 17, these being linked to fastening eyes 18 which are made secure in the body A in spaced relation to each other close to the remaining opposite edges thereof. Thus it will be seen that the handles 17 when in perpendicular position with the lifts stacked one above the other the said handles of the lower lift will occupy the recesses 16 of the upper lift in the stack when the fillers 15 are resting upon these lifts and nest the eggs 14. Thus the uppermost lift in the stack can be readily raised to permit the eggs nested by the filler 15 thereon to be conveniently candled or tested without removing the eggs from the filler and while such eggs are seated in the holes 13 in the body A and especially when the lifts with the fillers and eggs therein are within a crate or case.

What is claimed is:

An egg lift comprising a substantially square shaped flat sheet-like body having spaced rows of spaced perforations therein, a cushioning section correspondingly shaped to said body, superimposed thereon and having perforations matching the first-mentioned perforations, ears cut and bent from the body at opposite edges thereof for overlying portions adjacent thereto of the cushioning section and separably fastening the body and section together, eyes stapled through the body and cushioning section next to opposite edges thereof, and loop handles loosely connected to said eyes.

THEODORE FOOTE.